(12) United States Patent
Resch et al.

(10) Patent No.: US 8,769,035 B2
(45) Date of Patent: Jul. 1, 2014

(54) DISTRIBUTED STORAGE NETWORK FOR STORING A DATA OBJECT BASED ON STORAGE REQUIREMENTS

(75) Inventors: Jason K. Resch, Chicago, IL (US); Wesley Leggette, Oak Park, IL (US); S. Christopher Gladwin, Chicago, IL (US); Greg Dhuse, Chicago, IL (US); Andrew Baptist, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 507 days.

(21) Appl. No.: 12/839,181

(22) Filed: Jul. 19, 2010

(65) Prior Publication Data
US 2011/0106904 A1    May 5, 2011

Related U.S. Application Data

(60) Provisional application No. 61/256,436, filed on Oct. 30, 2009.

(51) Int. Cl.
*G06F 15/16* (2006.01)
*G06F 3/06* (2006.01)
*H04L 29/08* (2006.01)

(52) U.S. Cl.
CPC ............ *G06F 3/061* (2013.01); *H04L 67/1097* (2013.01)
USPC .......................................... 709/211; 707/999

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Shirley Zhang
(74) *Attorney, Agent, or Firm* — Garlick & Markison; Jessica W. Smith

(57) ABSTRACT

A distributed storage network (DSN) includes a user device and a plurality of DSN memories, wherein each of the DSN memories includes a plurality of storage units. The user device includes at least one network interface to the plurality of DSN memories and at least one processing module that is operable to determine one of the plurality of DSN memories for storing a data object based on a comparison of one or more storage requirements of the data object and one or more DSN attributes of the plurality of DSN memories.

18 Claims, 12 Drawing Sheets

(56) References Cited

U.S. PATENT DOCUMENTS

| | | |
|---|---|---|
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 8,171,101 B2 * | 5/2012 | Gladwin et al. ............ 709/216 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 * | 5/2003 | Shu ........................ 707/1 |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2006/0235850 A1 * | 10/2006 | Hazelwood et al. ............ 707/9 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0271349 A1 * | 11/2007 | Clemo et al. ............ 709/211 |
| 2007/0283167 A1 | 12/2007 | Venters, III et al. |
| 2008/0126357 A1 * | 5/2008 | Casanova et al. ............ 707/10 |
| 2008/0288563 A1 * | 11/2008 | Hinshaw et al. ............ 707/205 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0257219 A1 * | 10/2010 | Patel et al. ............ 707/827 |
| 2011/0066668 A1 * | 3/2011 | Guarraci ............ 707/831 |
| 2011/0125835 A1 * | 5/2011 | Soltis ............ 709/203 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner computing system10

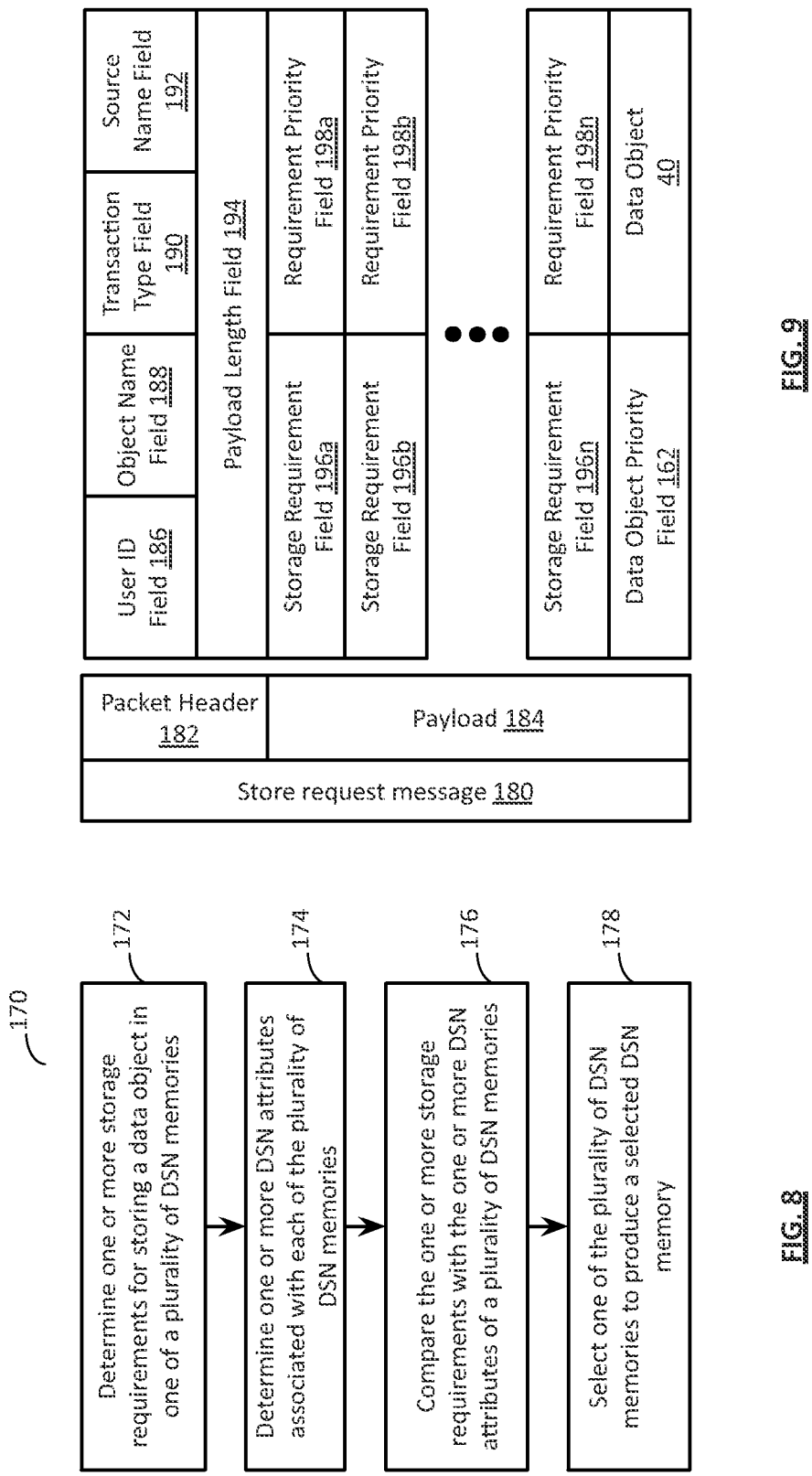

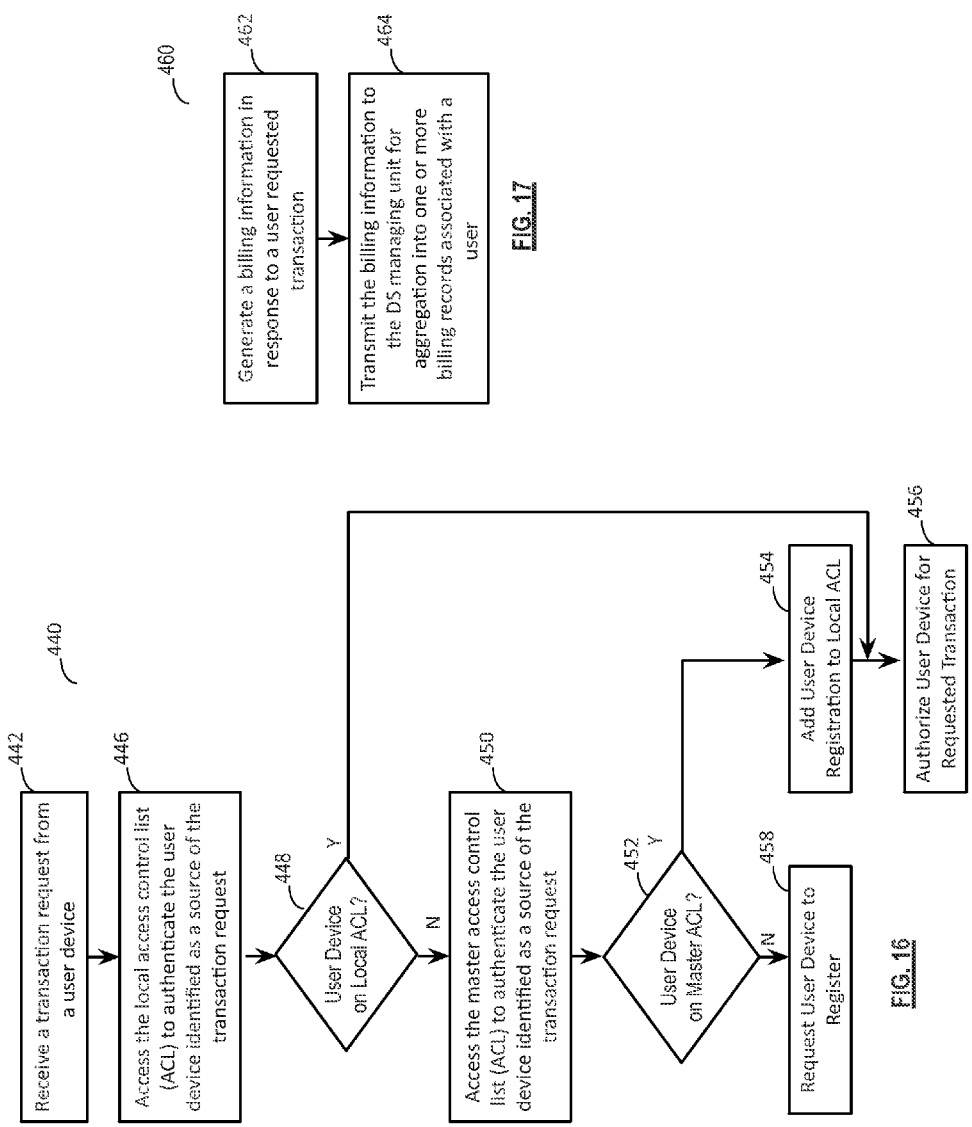

DISTRIBUTED STORAGE NETWORK FOR STORING A DATA OBJECT BASED ON STORAGE REQUIREMENTS

CROSS-REFERENCE TO RELATED PATENTS

This U.S. Utility Patent Application claims priority pursuant to 35 U.S.C. §119(e) to U.S. Provisional Application Ser. No. 61/256,436 entitled "DISTRIBUTED STORAGE NETWORK ACCESS," filed Oct. 30, 2009, pending, which is incorporated by reference herein in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to computing systems and more particularly to data storage within such computing systems.

2. Description of Related Art

This invention relates generally to computing systems and more particularly to data storage solutions within such computing systems.

DESCRIPTION OF RELATED ART

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally. This increased storage of information content increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 8 is a logic flow diagram of an embodiment of a method for storing a data object in a distributed storage network in accordance with the invention;

FIG. 9 is a schematic block diagram of an embodiment of a store request message in accordance with the invention;

FIG. 16 is a logic flow diagram of an embodiment of a method for authenticating a user device in accordance with the invention; and FIG. 17 is a logic flow diagram of an embodiment of a method for aggregating billing information in accordance with the invention.

DETAILED DESCRIPTION OF THE INVENTION

Figure 1:
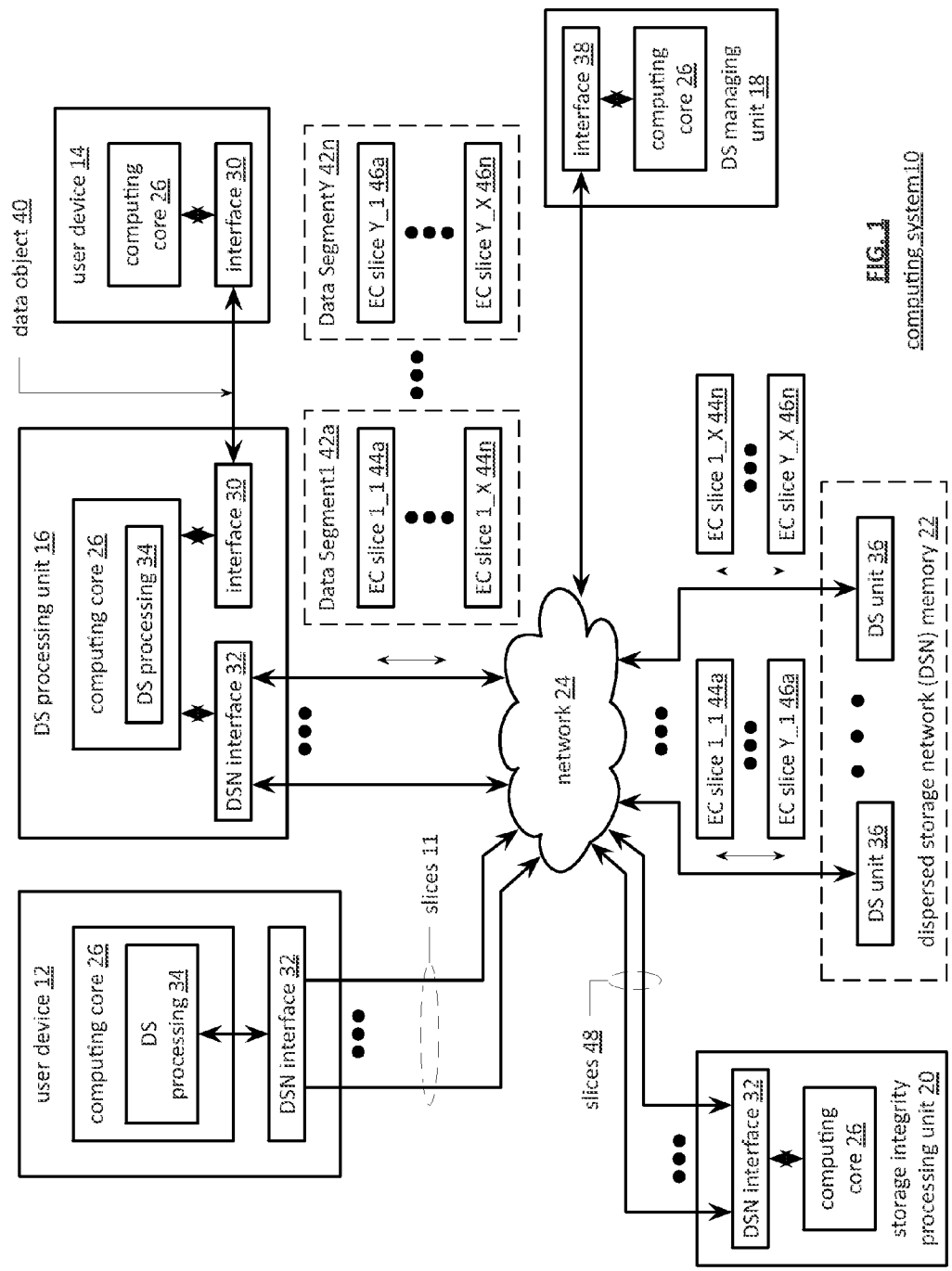
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 38. An embodiment of the computing core 26 will be described with reference to FIG. 2.

With respect to the interfaces, each of the interfaces 30, 32, and 38 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 38 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data object 40, such as a data file and/or data block, to store in the DSN memory 22, it sends the data object 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data object 40.

The DS processing unit 16 receives the data object 40 via its interface 30 and performs a distributed storage (DS) process 34 thereon (e.g., an error coding dispersal storage function). The DS processing 34 begins by partitioning the data object 40 into one or more data segments, which is represented as Y data segments. The DS processing 34 may partition the data object 40 into fixed byte size segments (e.g., 21 to 2n bytes, where n=>2) or variable byte size segments (e.g., change byte size from segment to segment, or from groups of segments to groups of segments, etc.).

For example, in FIG. 1 for each of the Y number of data segments 42a-n, the DS processing 34 error encodes (e.g., forward error correction (FEC), information dispersal algorithm, or error correction coding) and slices (or slices then error encodes) the data segments 42a-n into a plurality of error coded (EC) data slices 42a-42n and 46a-46n, which are represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an X/T system, then a data segment is divided into X number of slices, where T number of slices are needed to reconstruct the original data (i.e., T is the threshold). As a few specific examples, the X/T factor may be 5/3; 6/4; 8/6; 8/5; 16/10.

For each slice 44a-n and 46a-n, the DS processing unit 16 creates a unique slice name and appends it to the corresponding slice. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 44a-n and 46a-n to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 44a-n and 46a-n for transmission via the network 24.

The number of DS units 36 receiving the slices 44a-n and 46a-n is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice 44a and 46a of each of the data segments 42a-n is to be stored in a first DS unit 36, the second slice 44b and 46b of each of the data segments 42a-n is to be stored in a second DS unit 36, etc. In this manner, the data is encoded and stored at physically diverse locations in a distributed manner to improved data storage integrity and security. Further examples of encoding the data segments will be provided with reference to one or more of FIGS. 2-17.

Each DS unit 36 that receives a slice for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides data object 40 to the user device 14. Note that the first type of user device 12 performs a similar process to retrieve data object 40.

The storage integrity processing unit 20 performs the third primary function of data storage integrity verification. In general, the storage integrity processing unit 20 periodically retrieves slices 48, and/or slice names, of a data object 40 to verify that one or more slices have not been corrupted or lost (e.g., the DS unit failed). The retrieval process mimics the read process previously described.

If the storage integrity processing unit 20 determines that one or more slices 48 is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
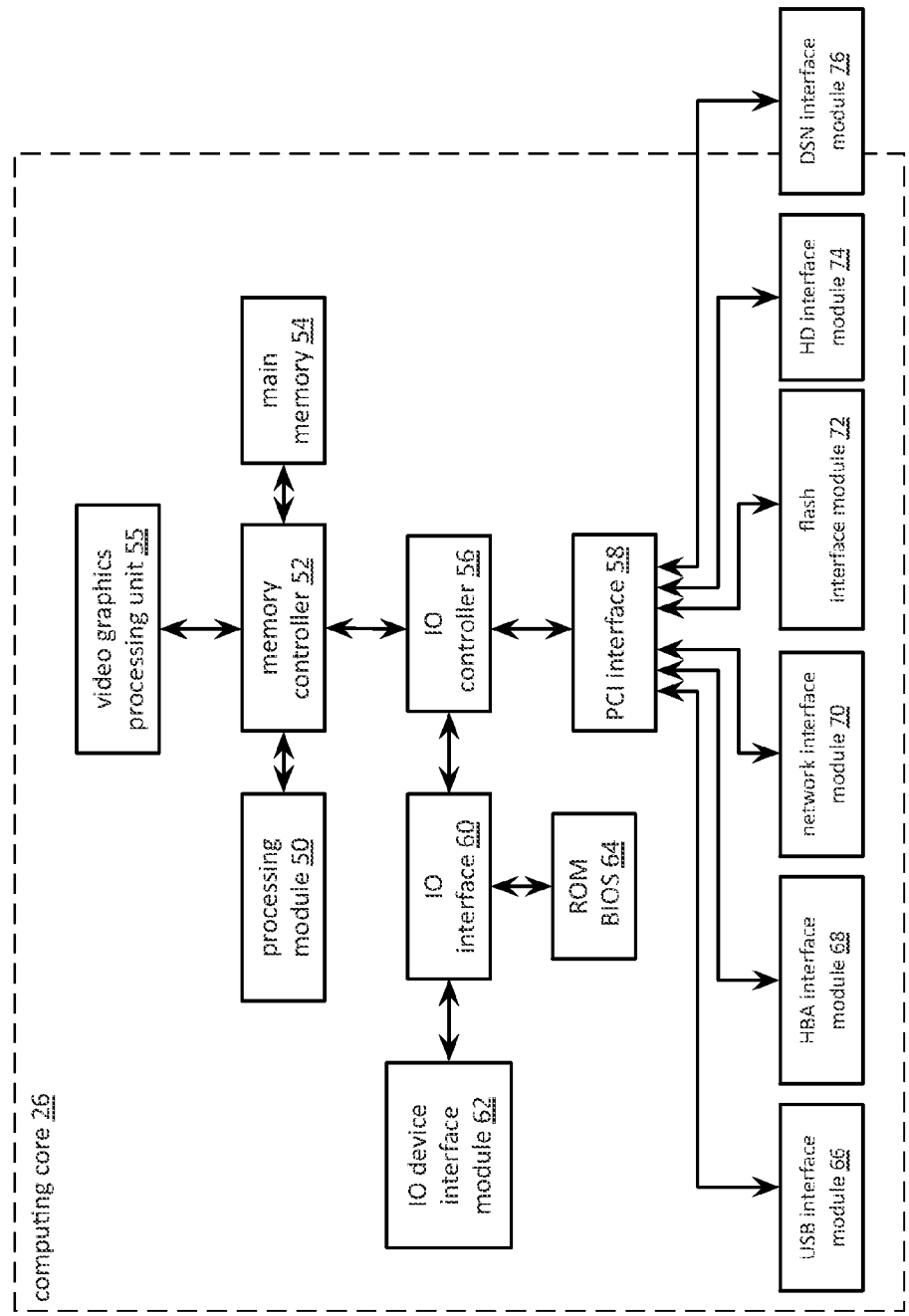
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO interface 60, IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17.

Figure 3:
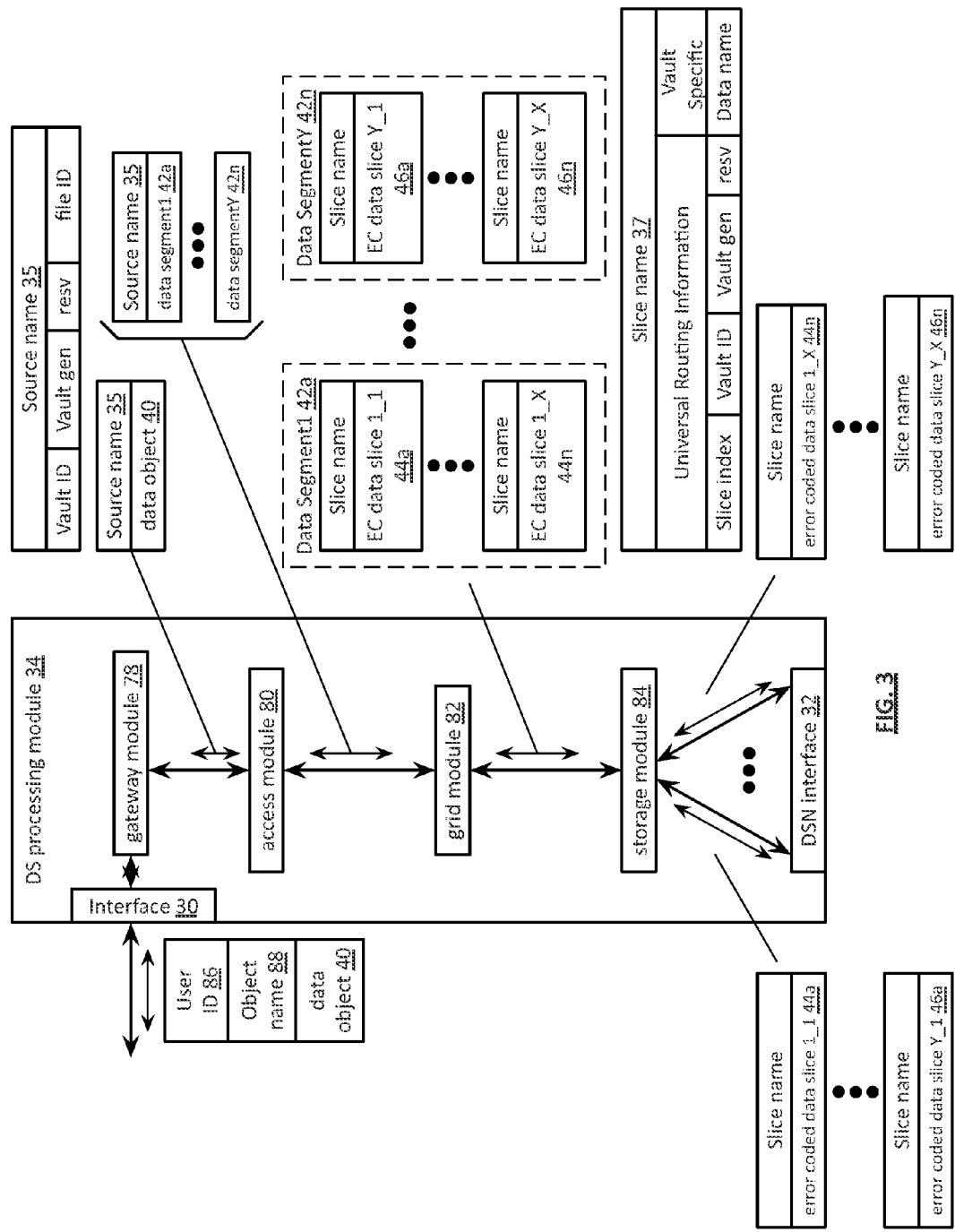
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and DSN interface 32 or the interfaces 30 and/or 32 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming request with a data object 40. The incoming request may also include a user ID field 86, an object name field 88 and other corresponding information such as a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device 12-Source 14, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data object 40. For instance, the gateway module 60 determines the source name 35 of the data object 40 based on the vault identifier and the data object 40.

For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a plurality of data segments 1 through Y 42a-n in accordance with a data storage protocol (e.g., file storage system, a block storage system, and/or an aggregated block storage system). The number Y of data segments may be fixed with a segment size depending on the data object size or the number of segments may vary with a fixed segment size. For example, when the number Y of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, when the segment size is fixed, then the number of segments Y varies based on the size of data object. For instance, if the data object is an image file of 4,194,304 bytes and the fixed segment size of each segment is 4,096 bytes, then the number of segments Y=1,024. Note that each segment is associated with the same source name 35.

The grid module 82 receives the Y data segments 42a-n and may manipulate (e.g., compression, encryption, cyclic redundancy check (CRC), etc.) each of the data segments 42a-n before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 44a-n and 46a-n.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold W is greater than or equal to the read threshold T (i.e., W≥T) for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number n and the vault ID and, as such, is unique for each pillar (e.g., slices of the same pillar for the same vault for any segment of a data object will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded (EC) data slices of a data segment are ready for storage, the grid module 82 determines which of the DS storage units 36 of the DSN memory 22 will store the EC data slices based on a dispersed storage memory mapping associated with the user's vault and/or DS storage unit 36 attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. In an embodiment, the number of DS storage units 36 of DSN memory 22 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module. The storage module then outputs the encoded data slices 1 through X of each segment 1 through Y to the DS storage units. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing 34, which authenticates the request. When the request is authentic, the DS processing 34 sends a read message to each of the DS storage units 36 storing slices of the data object being read. The slices are received via the DSN interface 32 and processed by the storage module 84, which performs a parity check and provides the slices to the grid module 82 when the parity check is successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
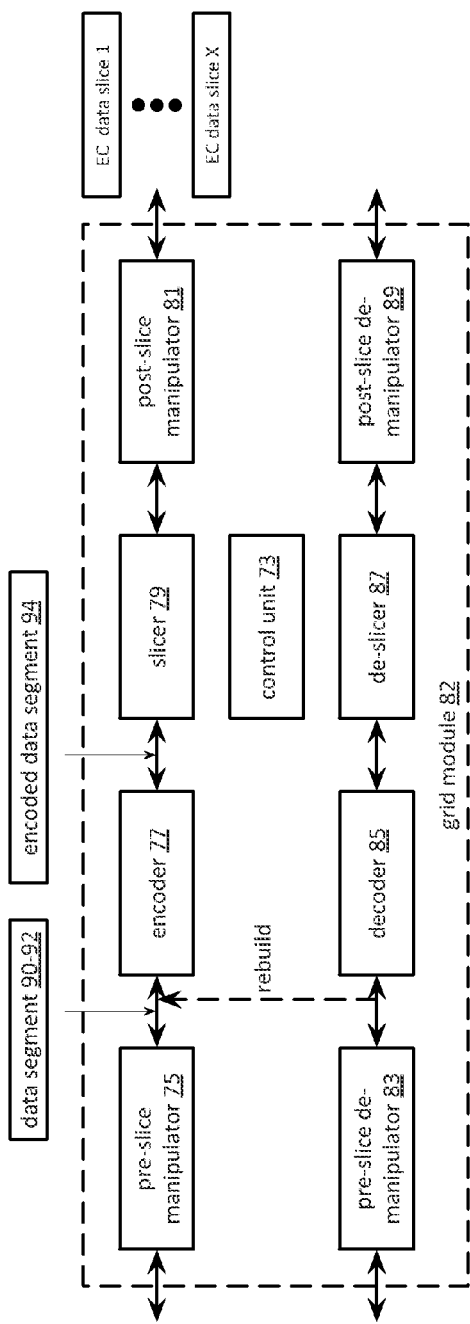
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 42 and a write instruction from an authorized user device. The pre-slice manipulator 75 determines if pre-manipulation of the data segment 42 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 42 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 42 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 42 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 42a-n, the same encoding algorithm for the data segments 42a-n of a data object, or a combination thereof.

The encoded data segment 94 is of greater size than the data segment 42 by the overhead rate of the encoding algorithm by a factor of X/T, where X is the width or number of slices, and T is the read threshold. In this regard, the corresponding decoding process can accommodate at most X-T missing EC data slices and still recreate the data segment 42. For example, if X=16 and T=10, then the data segment 42 will be recoverable as long as 10 or more EC data slices per data segment are not corrupted.

The slicer 79 transforms the encoded data segment 94 into EC data slices in accordance with the slicing parameter from the vault for this user and/or data segment 42. For example, if the slicing parameter is X=16, then the slicer slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 42. The pre-slice de-manipulator 83 performs the inverse function of the pre-slice manipulator 75 to recapture the data segment.

Figure 5:
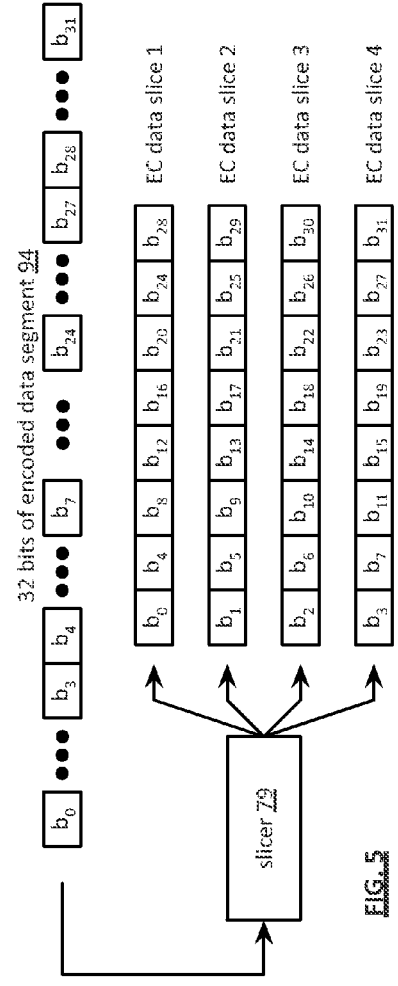
FIG. 5 is a diagram of an example embodiment of error coded data slice creation in accordance with the invention.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
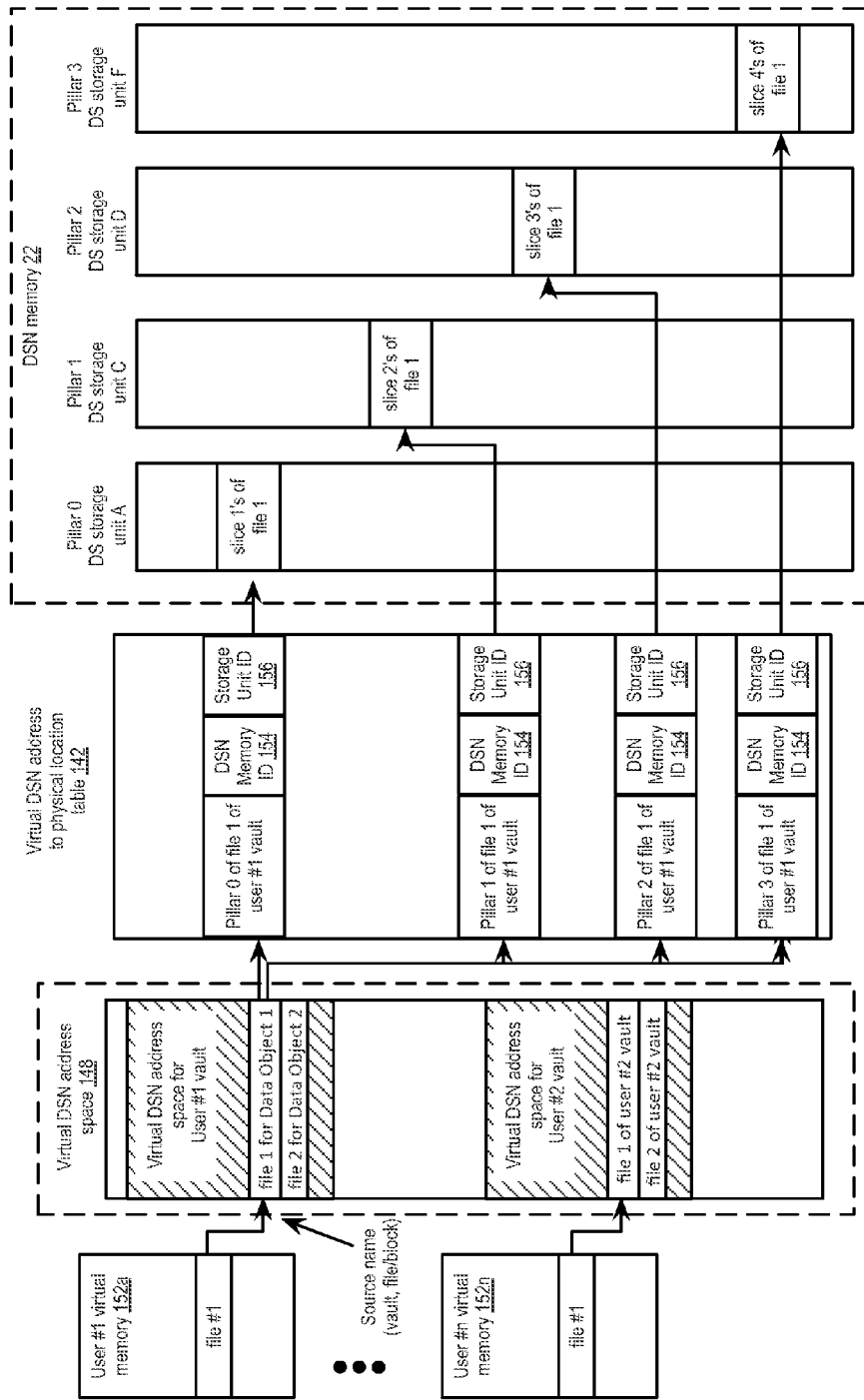
FIG. 6 is a schematic block diagram of an embodiment of a file system hierarchy in accordance with the invention.

FIG. 6 is a schematic block diagram of an embodiment of a file system hierarchy including a plurality of user virtual memories in a virtual DSN address space 148, a virtual dispersed storage network (DSN) address to physical location table 142, and a physical dispersed storage network (DSN) memory 22. The file system hierarchy is an illustration of translating a user virtual memory address space 152 into a virtual dispersed storage network (DSN) address space 148 and then to a physical address in a DSN memory 22. In this illustration, the physical DSN memory 22 includes a plurality of DS storage units 36 (e.g., A, C, D, and F). In an example, where there are four pillars, there are four slices (X=4) created for each of Y data segments. Pillars can be allocated to more than one DS storage unit, but a given DS storage unit is not generally assigned to store more than one pillar from a given file/data object of a user vault to improve system robustness (e.g., avoiding loss of multiple slices of a data segment as a result of a single DS storage unit failure).

In an embodiment, one of the plurality of user virtual memories 152a-n utilizes a native OS file system to access the virtual DSN address space 148 by including source name information in requests such as read, write, modify, delete, list, etc. A vault identifier in the source name and/or a file/block name may be used to index the virtual DSN address space 148 to determine a user vault. A unique virtual vault is associated with each user (e.g., an individual, a group of individuals, a business entity, a group of business entities, etc.) and may contain operational parameters (described with more detail with respect to FIG. 10), user attributes (e.g., user identification, billing data, etc.) and a list of DSN memories 22 and a plurality of storage units 36 for a DSN memory 22 that may be utilized to support the user.

In an example, the total virtual DSN address space 148 is defined by a forty-eight byte identifier thus creating 256^48 possible slice names. The virtual DSN address space 148 accommodates addressing of EC data slices corresponding to segments of data objects (e.g., data file, blocks, streams) over various generations and vaults. The slice name is a virtual DSN address and remains the same even as different DS memories 22 or DS storage units 36 are added or deleted from the physical DSN memory 22.

A user has a range of virtual DSN addresses assigned to their vault, user virtual memory 152a-n. For instance, the virtual DSN addresses typically do not change over the operational lifespan of the system for the user. In another instance, the virtual DSN address space 148 is dynamically altered from time to time to provide such benefits as improved security and expansion, retraction, and/or capability. A virtual DSN address space 148 security algorithm may alter the virtual DSN address space 148 according to one or more of a command (e.g., from the DS managing unit 18), a schedule, a detected security breach, or any other trigger. The virtual DSN address may also be encrypted in use thus requiring encryption and decryption steps whenever the virtual DSN address is used.

The vault and file name index used to access the virtual DSN address space 148 and to create the slice names (virtual DSN addresses) may also be used as an index to access the virtual DSN address to physical location table 142. For example, the virtual DSN address to physical location table 142 is sorted by vaults and pillars so that subsequent addresses are organized by pillar of the file data segments of a data object that have EC data slices with the same slice identifier and hence are typically stored at the same DS storage unit (e.g., slices having a first pillar identifier are stored in DS storage unit A of DSN memory 22). The output of the access to the virtual DSN address to physical location table 142 is the DSN memory identifier 154 and DS storage unit identifiers 156. A source name, data segment header and/or slice name may include the DSN memory identifier 154 and/or DS storage unit identifiers 156.

The slice names may be used as the virtual index to the memory system of each DS storage unit 36 of a particular DS memory 22 to gain access to the physical location of the EC data slices. In this instance, the DS storage unit 36 of the DSN memory 22 maintains a local table correlating slice names (virtual DSN address) to the addresses of the physical media internal to the DS storage unit 36. For example, user number 1 has a vault identified operational parameter of four pillars and pillar 0 is mapped to DS storage unit A of DSN memory 22, pillar 1 is mapped to DS storage unit C of DSN memory 22, pillar 2 is mapped to DS storage unit D of DSN memory 22, and pillar 3 is mapped to DS storage unit F of DSN memory 22.

Figure 7:
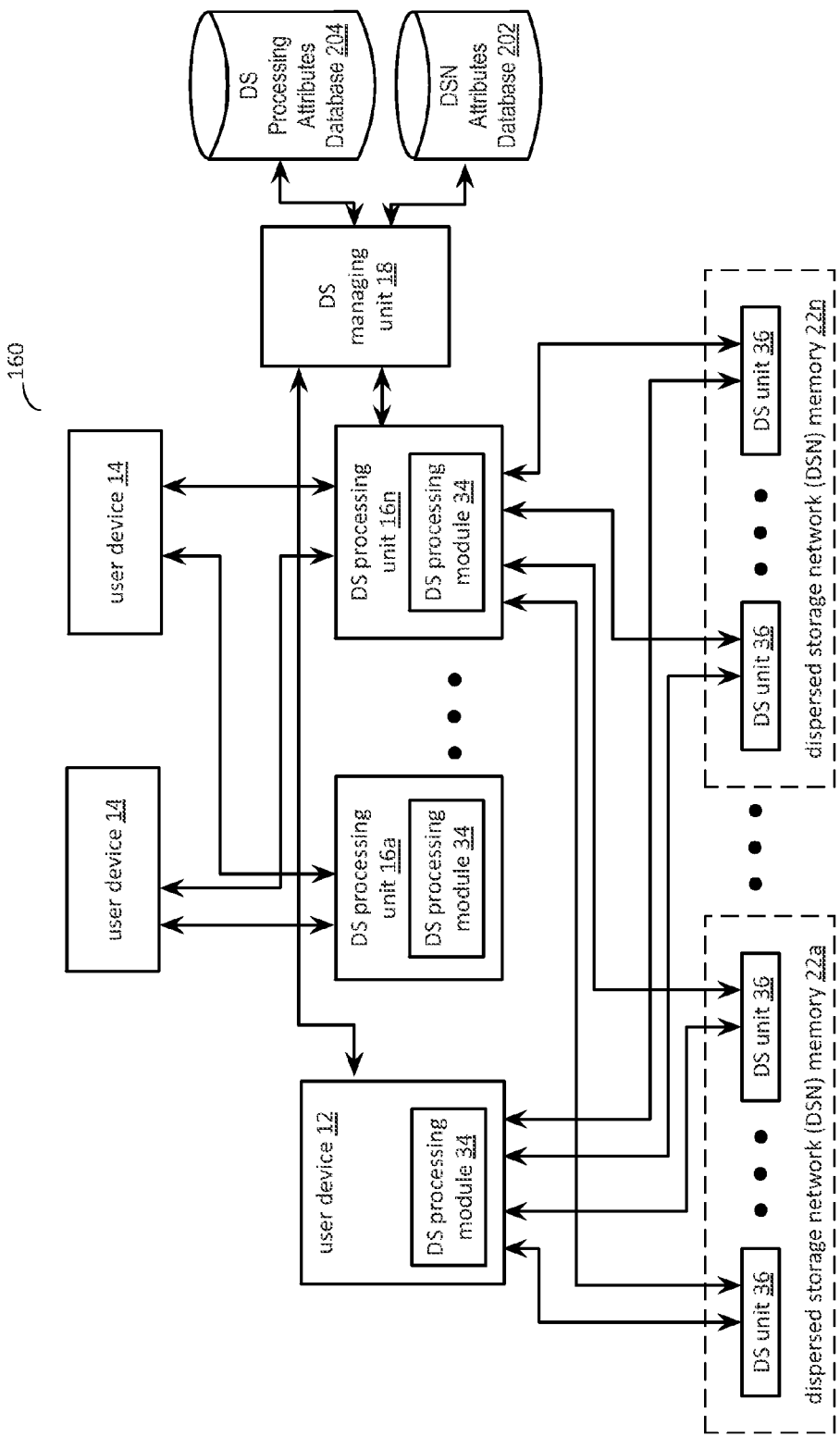
FIG. 7 is a schematic block diagram of an embodiment of a distributed storage network 160 that includes a plurality of DSN memories in accordance with the invention.

FIG. 7 is a schematic block diagram of an embodiment of a distributed storage network 160 that includes a plurality of DSN memories 22*a-n* and a plurality of DS processing units 16*a-n*. The DS processing units 16*a-n* each include a DS processing module 34 and may be operably coupled to serve each user device 14 or mapped to support a subset of the user devices 14. For example, DS processing unit 16*a* may support user devices 1-100, DS processing unit 16*b* may support user devices 101-150, etc. In another embodiment, a user device 14 may select a DS processing unit 16 based on one or more DS processing attributes. The DS processing units 16*a-n* may be of different DSN providers (e.g., storage service providers), different private entities (e.g., an enterprise or government agency), and may have different DS processing attributes. DS processing attributes include, for example, one or more of availability, reliability, performance history, link speed, link latency, service provider, capacity, capabilities, cost, data ownership, contractual service obligations, and/or other factors. The DS managing unit 18 receives the DS processing attributes from the user devices 14 and/or the DS processing units 16 and stores the DS processing attributes in DS processing attribute database 204.

In an embodiment, each of the DS processing modules 34 in the DS processing units 16 is operably coupled to a plurality of the DSN memories 22*a-n* such that a DS processing module 34 may store or retrieve data objects on behalf of the user devices 14 to and from such plurality of DSN memories 22*a-n*. Each of the DS processing units 16 may be operably coupled to a same or different plurality of DSN memories 22*a-n*.

The network may also include one or more user devices 12 that include a DS processing module 34. Similarly to the DS processing units 16, each DS processing module 34 in a user device 12 is operably coupled to a plurality of the DSN memories 22*a-n* such that the DS processing module 34 in the user device 12 may store or retrieve data objects on behalf of the user device 12 to and from such plurality of DSN memories 22*a-n*.

The DSN memories 22*a-n* may be of different DSN providers (e.g., storage service providers), different private entities (e.g., an enterprise or government agency), and may have different DSN attributes. For example, DSN attributes include one or more of number of DS units, geographic diversity of DS units, geographic location, load, availability, reliability, performance history, link speed, link latency, service provider, capacity (such as available DSN memory), capabilities, cost, data ownership, contractual service obligations, and/or other factors. The DS managing unit 18 receives the DSN attributes from the DSN memories 22, the DS units 36, the user devices 12, 14 and/or the DS processing units 16 and stores the DSN attributes in DSN attribute database 202. The DSN memories 22*a-n* and/or DS managing unit 18 provides the DS processing modules 34 (in user device 12 and DS processing units 16) with the DSN attributes to assist in selection of a DSN memory 22.

FIG. 8 illustrates a logic flow diagram of an embodiment of a method 170 for storing data objects in the distributed storage network 160. In step 172, one or more storage requirements for storing a data object in one of a plurality of DSN memories 22 are determined. The storage requirements include, for example, one or more of number of DS units, physical diversity of DS units, availability, reliability, performance history, link speed, link latency, service provider, capacity (such as available DSN memory), capabilities, cost, data ownership, contractual service obligations, and/or other factors. In step 174, one or more DSN attributes associated with each of a plurality of DSN memories 22*a-n* is determined. The one or more DSN attributes are compared with the one or more storage requirements in step 176 and one of the plurality of DSN memories is selected to produce a selected DSN memory in step 178. In an embodiment, DS processing module 34 in DS processing unit 16 determines the selected DSN memory 22. In another embodiment, the user device 12, 14 determines the selected DSN memory 22. In yet another embodiment, the user device 14 determines the selected DSN memory 22 with assistance from the DS processing unit 16.

The data object is partitioned into a plurality of data segments, and the data segments are processed to generate a plurality of encoded data slices based on an error encoding dispersal function. The plurality of encoded data slices is then transmitted to the selected DSN memory 22. A message is sent to the DS managing unit 18 to update the vault registry for the user device 14, 16 with the selected DSN memory for the data object. The DS managing unit 18 updates the DSN memory ID field 154 and Storage Unit ID field 156 for the data object in the virtual DSN address to physical location table 142.

FIG. 9 illustrates a schematic block diagram of an embodiment of a store request message. In an embodiment, a user device 12, 14 transmits a store request message 180 to a DS processing module 34 (either in the user device 12 or in a DS processing unit 16) requesting to store a data object in the distributed storage network 160. The store request message 180 includes a packet header 182 having for example, a user ID field 186, object name field 188, transaction type field 190, source name field 192 and payload length field 194. The transaction type field 190 identifies the packet as a store request and includes a transaction identifier. The payload 184 of the store request message 180 includes one or more storage requirements 196*a-n*. In an embodiment, the store request message 180 also includes one or more requirement priorities 198*a-n* associated with the storage requirements 196*a-n*. For example, a first higher priority level may be assigned to a first storage requirement and second lower priority assigned to a second storage requirement, such as a higher priority to a cost level D and a lower priority to a geographic region preference of region R. The payload 184 further includes a data object priority field 162 and a data object 40.

In operation, DS processing module 34 receives a store request message 180 and authenticates the user ID to determine authorization for the requested transaction type. The DS processing module 34 requests authentication from the DS managing unit 18 or accesses a local authentication control list to determine authentication as described further herein. When authenticated, the DS processing module 34 processes the source name field 192 information in the store request 180 to determine a vault identifier to index the user vault in the virtual DSN address space 148. When a source name is not available, the DS processing module 34 utilizes the user ID and object name to index the user vault in the virtual DSN address space 148. The DS processing module 34 then processes the one or more storage requirements and associated requirement priorities to determine the selected DSN memory as described herein.

Figure 10:
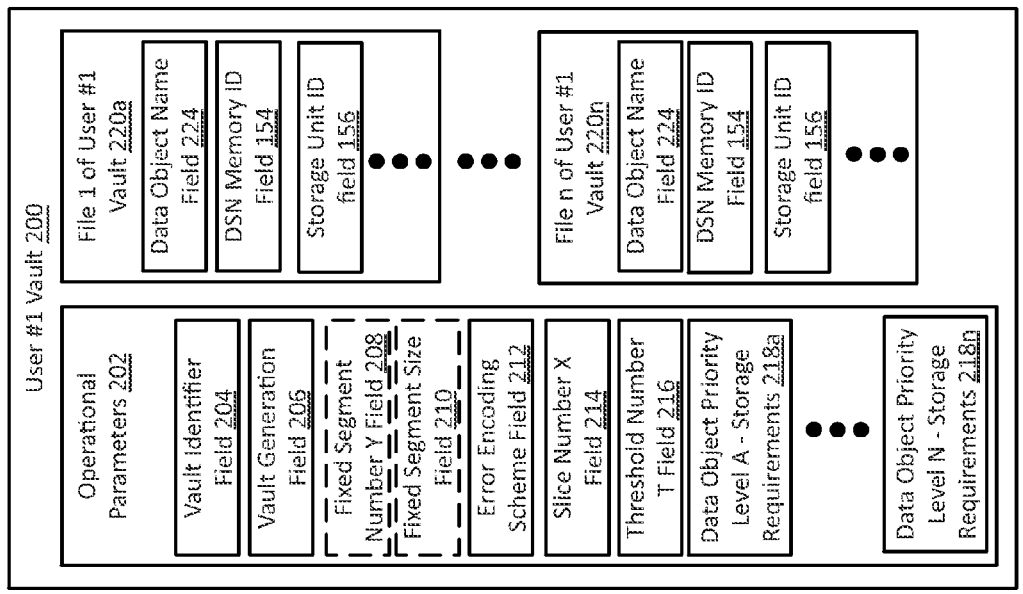
FIG. 10 is a schematic block diagram of an embodiment of a user vault in accordance with the invention.

FIG. 10 illustrates a schematic block diagram of an embodiment of certain parameters associated with a user vault 200. The parameters associated with a user vault 200 shown in FIG. 10 may also include other fields not described herein. The parameters illustrated in FIG. 10 may be stored in the user vault 200 or other resource, such as a user file, parameter database, file/block index, URL, etc. that is implemented in the managing unit 18, DS processing unit 16 or a DS processing module 34. The operational parameters 202 include vault identifier field 204, vault generation field 206, error encoding scheme field 212, slice number X field 214 (e.g., number of pillars n for the user vault), threshold number T field 216, a fixed segment number Y field 208 and/or a Fixed Segment Size Field 210.

In an embodiment, the operational parameters 202 also include one or more data object priority level storage requirement fields 218*a-n*. The fields 218*a-n* include one or more storage requirements (with any associated requirement priorities) for a particular data object priority level. The fields 218*a-n* may be included in another resource, such as a user file, parameter database, file/block index, URL, etc. that is implemented in the managing unit 18, DS processing unit 16 or a DS processing module 34. In this embodiment, a DS processing module 34 receives a store request message 180 with a data object priority field 162 and accesses the one or more data object priority level storage requirement fields 218*a-n* to determine storage requirements and associated requirement priorities based on the data object priority. For example, for a data object with a high priority level, cost may have a lower requirement priority while reliability has a higher requirement priority.

The user vault 200 in FIG. 10, or other resource associated with user vault 200, also stores data object files 220*a-n* with data segment information specific to data objects, including data object name field 224, DSN memory ID field 154 and storage unit ID field 156. The DS managing unit 18 updates the DSN memory ID field 154 and Storage Unit ID field 156 for the plurality of encoded data slices of the data object in the user vault 200 and/or the virtual DSN address to physical location table 142. When a data object is stored in a selected DSN memory 22, the DSN memory ID field 154 is updated with the selected DSN memory and the Storage Unit ID field 156 is updated with a storage unit ID for each pillar of encoded data slices of the data object 40. A data segment header, source name and/or slice name may also be updated with the with the selected DSN memory or storage unit ID for the plurality of encoded data slices.

Figure 11:
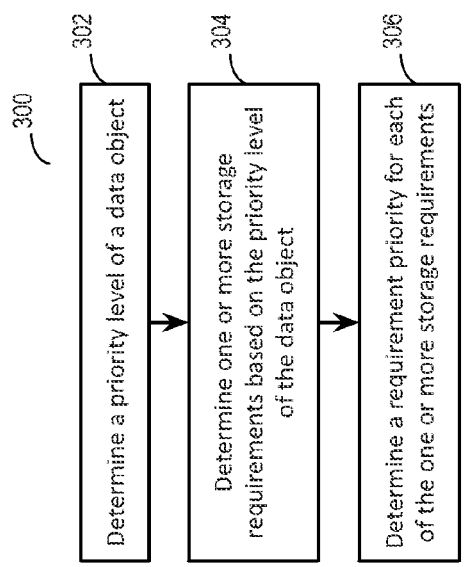
FIG. 11 is a logic flow diagram of an embodiment of a method for determining one or more storage requirements in accordance with the invention.

FIG. 11 is a logic flow diagram that illustrates an embodiment of a method 300 for determining one or more storage requirements for storing a data object 40. In step 302, a priority level of a data object 40 is determined. For example, a priority level for a data object 40 is determined from the user device 12, 14, from the store request message 180, etc. In step 304, one or more storage requirements are determined based on the priority level of the data object 40 and in step 306, a requirement priority for each of the one or more storage requirements is determined. The storage requirements and associated requirement priorities are determined based on the one or more data object priority level-storage requirement fields 218*a-n* stored in the user vault 200 or in a user device 12, 14 and/or in a DS processing unit 16. In another embodiment, the storage requirements and associated requirement priorities are determined based on the store request message 180.

Figure 12:
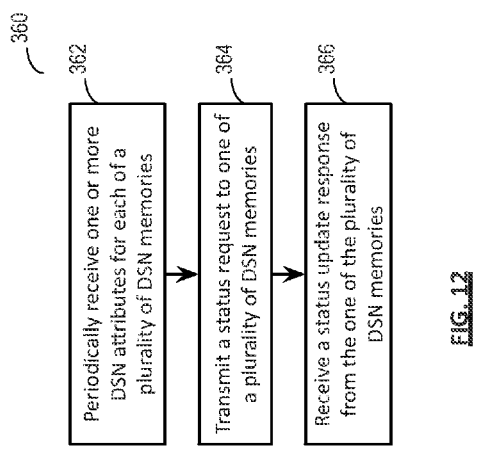
FIG. 12 is a logic flow diagram of an embodiment of a method for determining one or more DSN attributes for a plurality of DSN memories in accordance with the invention.

FIG. 12 is a logic flow diagram that illustrates an embodiment of a method 360 for determining one or more DSN attributes for a plurality of DSN memories 22*a-n*. In an embodiment, the DSN attributes are periodically received by the DS managing unit 18, user device 12, 14, and/or DS processing units 16 in step 362. The periodic updates of DSN attributes may be transmitted by the DSN memories 22*a-n* or DS units 36. In step 364, a status request is transmitted to one of the plurality of DSN memories 22 by the DS managing unit 18, user device 12, 14, and/or DS processing units 16. The status request includes a request for a status update of one or more DSN attributes of the DSN memory 22 or one or more of the DS units 36. In step 366, the status update response is received. In an embodiment, the DS managing unit 18 receives the DSN attributes from the DSN memories 22, the DS units 36, the user devices 12, 14 and/or the DS processing units 16 and stores the DSN attributes in DSN attribute database 14. The DS managing unit 18 then provides periodic updates, or updates in response to a request, to the user devices 12, 14 and DS processing units 16 of the DSN attributes.

Figure 13:
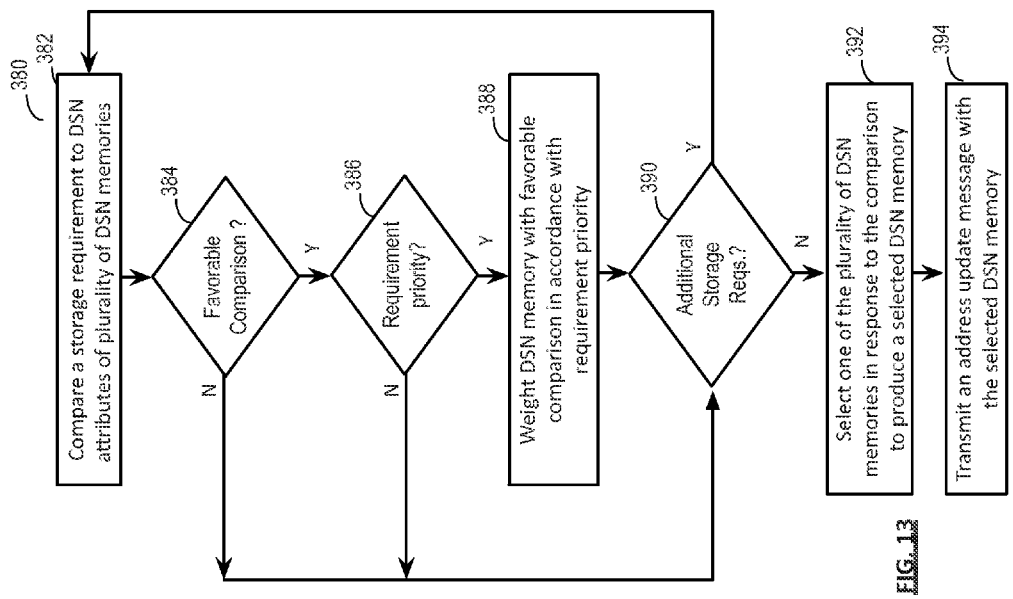
FIG. 13 is a logic flow diagram of an embodiment of a method for selecting one of the plurality of DSN memories in accordance with the invention.

FIG. 13 illustrates a logic flow diagram that illustrates an embodiment of a method 380 for selecting one of the plurality of DSN memories based on a comparison with one or more storage requirements and one or more DSN attributes. In step 382, a storage requirement is compared to DSN attributes of a plurality of DSN memories. For example, if the storage requirement is 99.999% availability, then the DSN attribute of availability for each of the plurality of DSN memories 22 is compared to 99.999% availability. In step 384, it is determined whether the comparison is favorable, e.g. whether a DSN memory has an availability of 99.999% or better. If no, then the process goes to step 390 to determine whether additional storage requirements need to be compared.

When one or more DSN memories 22 have a favorable comparison, then the process proceeds to step 386 to determine whether the storage requirement has an associated requirement priority. If yes, then in step 388, the one or more DSN memories with a favorable comparison are assigned a weight or priority in accordance with the requirement priority. For example, if the storage requirement of 99.999% availability had a high requirement priority, then the DSN memories with a favorable comparison are assigned a greater weight when selecting the DSN memory. The process then proceeds to step 390 to determine whether additional storage requirements need to be compared and if so, the comparison of storage requirements continues at step 382.

When the storage requirements have each been compared, and weights assigned to DSN memories with favorable comparisons, then one of the DSN memories is selected in step 392 to produce a selected DSN memory. An address update message is then transmitted to the DS managing unit 18 with the selected DSN memory in step 394.

Figure 14:
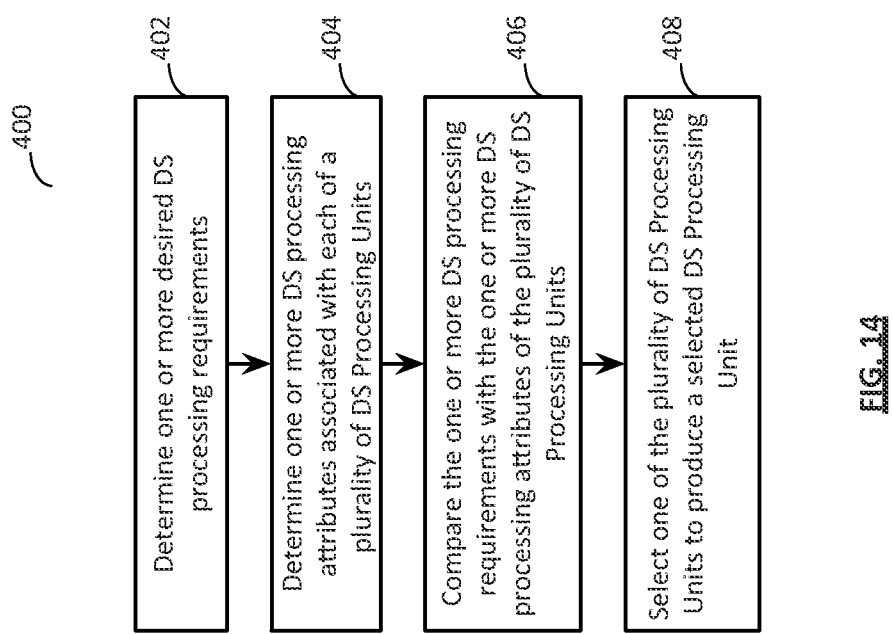
FIG. 14 is a logic flow diagram that illustrates an embodiment of a method for selecting one of a plurality of DS processing units in accordance with the invention.

FIG. 14 is a logic flow diagram that illustrates an embodiment of a method 400 for selecting one of a plurality of DS processing units 16 to support a user device 14. As shown in FIG. 7, the DS processing units 16a-n may be operably coupled to support a subset of the user devices 14. For example, DS processing unit 16a may support user devices 1-100, DS processing unit 16b may support user devices 101-200, etc.

In another embodiment, a user device 14 may select a DS processing unit 16 based on one or more DS processing attributes. In another embodiment, the DS managing 18 selects a DS processing unit 16 for a user device 14 based on one or more DS processing attributes. The DS processing attributes include one or more of availability, reliability, performance history, link speed, link latency, service provider, capacity, capabilities, cost, data ownership, contractual service obligations, and/or other factors. For example, a DS processing unit 16a may support certain error dispersal functions while another DS processing unit 16b supports additional or different error dispersal functions. The DS processing unit 16 may be selected to be utilized by a user device 14 for a predetermined period of time, for processing a predetermined number of data objects, for processing data objects having a certain priority level or for each data object separately.

In step 402, one or more desired processing requirements are determined. The processing requirements may also be assigned a priority level. In step 404, one or more DS processing attributes are determined for each of the plurality of DS processing units 16. The DS processing attributes may be provided by the DS managing 18 or by the DS processing units 16 themselves. The one or more processing requirements are compared with the one or more DS processing attributes of each of the plurality of DS processing units in step 406, and then one of the DS processing units is selected to produce a selected DS processing unit in step 408.

Figure 15:
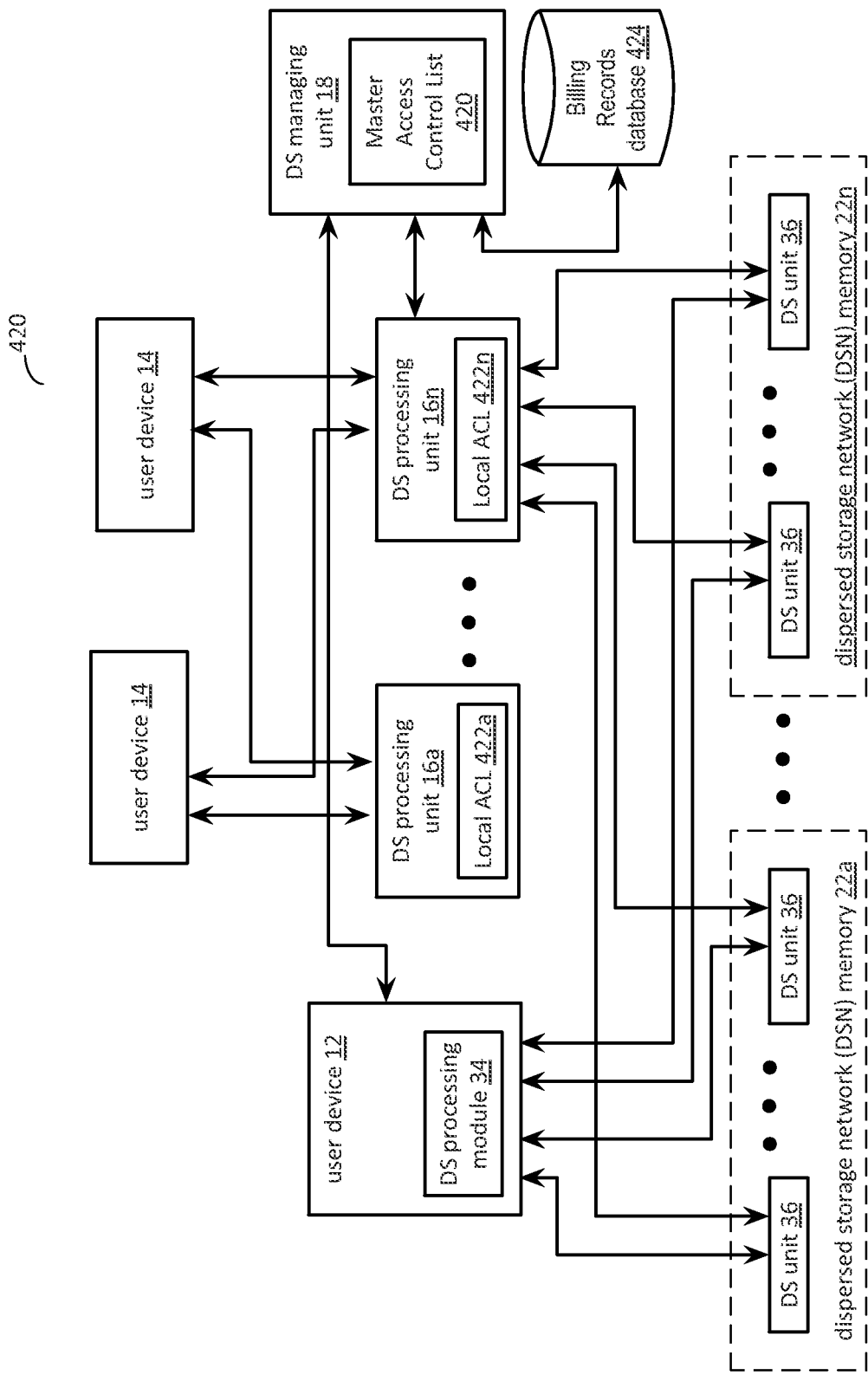
FIG. 15 is a schematic block diagram of another embodiment of a distributed storage network in accordance with the invention.

FIG. 15 is a schematic block diagram of another embodiment of a distributed storage network 420. The DS processing units 16a-n each include a DS processing module 34 and may be operably coupled to serve each user device 14 or mapped to support a subset of the user devices 14. In an embodiment, each of the DS processing modules 34 (in the user device 12 and in the DS processing units 16) is operably coupled to a plurality of the DSN memories 22a-n such that a DS processing module 34 may store or retrieve data objects on behalf of the user devices 14 to and from such plurality of DSN memories 22a-n. Each of the DS processing units 16 may be operably coupled to a same or different plurality of DSN memories 22a-n. The distributed storage network 420 may also include one or more user devices 12 that include a DS processing module 34. Similarly to the DS processing units 16, each DS processing module 34 in a user device 12 is operably coupled to a plurality of the DSN memories 22a-n such that the DS processing module 34 in the user device 12 may store or retrieve data objects on behalf of the user device 12 to and from such plurality of DSN memories 22a-n.

In an embodiment, the DS managing unit 18 maintains a master access control list (ACL) 420. The master ACL 420 includes user registrations of authorized user devices 12, 14 and authorized transactions for such registered user devices 12, 14. In an embodiment, a new user device registers with the DS managing unit 18 which then includes a user registration of the user device and its authorized transactions on the master ACL 420. To facilitate the authorization process, the DS managing unit 18 provides a local access control list (ACL) 422a-n to one or more of the plurality of DS processing units 16a-n. The local ACL 422 includes user registrations for user devices served by the DS processing unit. Since a user device 14 may utilize different DS processing units 16 from time to time, the DS managing unit 18 may include a user registration on one or more local ACLs 422a-n.

In another embodiment, a new user device registers with a DS processing unit 16 which then adds the user registration to its local ACL 422. The DS managing unit 18 receives the local ACLs 422a-n periodically and aggregates the local ACL registration information into the master ACL 420. The DS processing module 34 in user device 12 typically does not receive a local ACL 422, and the user device 12 must obtain authorization from the DS managing unit 18.

FIG. 16 is a logic flow diagram of an embodiment of a method 440 for authenticating a user device. In operation, a user device 14 transmits a transaction request message (store, read, modify, etc.) to one of the plurality of DS processing units 16a-n. The transaction request message includes the user ID and a requested transaction (e.g., store, retrieve, or delete a data object). The DS processing unit 16 receives the transaction request message in step 442 and verifies whether the user device is authorized to perform the requested transaction by accessing the local ACL 422 in step 446. When the DS processing unit 16 determines that the user registration is on the local ACL 422 in step 448, the process goes to step 456 wherein the user device is authorized for the requested transaction. When the DS processing unit 16 determines that the user registration is not on the local ACL 422 in step 448, it then accesses the master ACL 420 to verify whether the user device is authorized to perform the requested transaction in step 450. When the user registration is on the master ACL in step 452, in an embodiment, the DS processing unit 16 adds the user registration to its local ACL 422 in step 454. The DS processing unit 16 then authorizes the user device for the requested transaction in step 456. When the DS processing unit 16 determines that the user registration is not in the local ACL 422 or in the master ACL 420, the DS processing unit 16 requests the user device 14 to perform a registration process (e.g., account creation, credit card info provided, etc.) in step 458.

Referring back to FIG. 15, the distributed storage network 420 further includes a billing records database 424. In an embodiment, the user devices 12, 14, DS processing units 16a-n, DSN memories 22a-n generate billing information based on user transactions. The billing information is transmitted to the DS managing unit 18 which aggregates the billing information by transaction ID and user ID into one or more billing records. For example, when a DS processing unit 16 receives a store request message 180 for a data object 40, it generates billing information based on this transaction, such as amount of data processed for the transaction, data object byte size, etc. The DS processing unit 16 then transmits the billing information with a transaction ID and user ID to the DS managing unit 18.

In an embodiment, the DS processing unit 16 stores transaction records for user devices that it serves in a local registry and generates billing information based on the transaction records. For example, the DS processing unit 16 may generate billing information on how much data each user device stores and how often the data is retrieved. The DS processing unit 16 may then send the billing information to the DS managing unit 18 for aggregation.

FIG. 17 is a logic flow diagram of an embodiment of a method 460 for aggregating billing information in a distributed storage network. In step 462, billing information is generated in response to a user requested transaction. For example, the transaction may include a store request, write request, delete request, modify request, etc. The billing information may be generated by the user device 12, 14, the DS processing unit 16, the DS managing unit 18, DSN memory 22 and/or DSN units 36. The billing information is transmitted to the DS managing unit 18 or other billing server/module, for aggregation with other billing information into one or more billing records for a user in step 464. In an embodiment, the billing information is aggregated based on a transaction ID and user ID. Billing statistics may also be generated based on the billing information, such as daily usage statistics, average bytes stored daily, etc.

As may be used herein, the term(s) "coupled to" and/or "coupling" and/or includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for storing a data object in a distributed storage network (DSN), wherein the method comprises:
receiving a store request message to store a data object, wherein the store request message includes the data object and one or more storage requirements for the data object and wherein the store request message includes a storage requirement of the one or more storage requirements having a first higher priority level and a second storage requirement of the one or more storage requirements having a second lower priority level;
determining one or more DSN attributes associated with each of a plurality of DSN memories, wherein the plurality of DSN memories includes a plurality of storage units;
selecting one of the plurality of DSN memories in response to a comparison of the one or more DSN attributes and the one or more storage requirements for the data object to produce a selected DSN memory;
partitioning the data object into a plurality of data segments and processing the plurality of data segments to generate a plurality of encoded data slices based on an error encoding dispersal function;
transmitting the plurality of encoded data slices to the plurality of storage units of the selected DSN memory; and
transmitting an address update message to a DS managing unit to update a user vault with the selected DSN memory for the data object.

2. The method of claim 1, further comprising determining the one or more storage requirements for the data object by:
determining a priority level of the data object; and
accessing a resource that includes storage requirements for the priority level of the data object.

3. The method of claim 1, further comprising:
receiving the store request message for the data object from a user device; and
accessing a local access control list (ACL) to authenticate the user device.

4. The method of claim 1, wherein selecting one of the plurality of DSN memories includes:
allocating a greater weight to a first favorable comparison between a first DSN attribute and one of the storage requirements with the first higher priority level; and
allocating a lesser weight to a second favorable comparison between a second DSN attribute and one of the storage requirements with the second lower priority level.

5. The method of claim 4, wherein the one or more DSN attributes includes one or more of the following: cost, geographic location, geographic diversity, performance, reliability, latency, capacity, load and availability.

6. The method of claim 5, further comprising:
receiving periodic updates on the one or more DSN attributes for the plurality of DSN memories.

7. The method of claim 1, further comprising:
generating billing information in response to storing the data object in the selected DSN memory; and
transmitting the billing information to a managing unit for aggregation into one or more billing records associated with a user.

8. A user device in a distributed storage network (DSN), comprises:
at least one network interface to the distributed storage network; and
at least one processing module that is operable to:
determine to store a data object;
determine one or more storage requirements for storing the data object in one of a plurality of DSN memories in the distributed storage network, wherein a first storage requirement of the one or more storage requirements has a first higher priority level and a second storage requirement of the one or more storage requirements has a second lower priority level;
determine one or more DSN attributes associated with each of the plurality of DSN memories;
select one of the plurality of DSN memories to produce a selected DSN memory in response to a comparison of the one or more storage requirements of the data object with the one or more DSN attributes for the selected DSN memory;
select one of a plurality of DSN processing units to produce a selected DSN processing unit;
transmit a store request message to the selected DSN processing unit to generate a plurality of encoded data slices from the data object using an error encoding dispersal function and transmit the plurality of encoded data slices to the selected DSN memory; and
transmit an address update message to a DS managing unit to update a user vault with the selected DSN memory for the data object.

9. The user device of claim 8, wherein the processing module is further operable to:
determine a priority level of the data object; and
accessing a resource that includes storage requirements for the priority level of the data object.

10. The user device of claim 8, wherein the processing module is further operable to:
allocate a greater weight to a first favorable comparison between a first DSN attribute and the first storage requirement with the first higher priority level; and
allocate a lesser weight to a second favorable comparison between a second DSN attribute and the second storage requirement with the second lower priority level.

11. The user device of claim 10, wherein the one or more DSN attributes includes one or more of the following: cost, geographic location, geographic diversity, performance, reliability, latency, capacity, load and availability.

12. A distributed storage (DS) processing unit in a distributed storage network (DSN), comprises:
at least one network interface to a plurality of DSN memories in the distributed storage network, wherein each of the plurality of DSN memories includes a plurality of storage units; and
at least one processing module that is operable to:
receive a store request message for storing a data object, wherein the store request message includes one or more storage requirements for the data object and wherein the store request message includes a storage requirement of the one or more storage requirements having a first higher priority level and a second storage requirement of the one or more storage requirements having a second lower priority level;
determine one or more DSN attributes associated with each of the plurality of DSN memories;
select one of the plurality of DSN memories to generate a selected DSN memory in response to a comparison of the one or more storage requirements for the data object with the one or more DSN attributes of the plurality of DSN memories;
partition the data object into a plurality of data segments and process the plurality of data segments to generate a plurality of encoded data slices using an error encoding dispersal function;
transmit the plurality of encoded data slices to the plurality of storage units of the selected DSN memory; and
transmit an address update message to a DS managing unit to update a user vault with the selected DSN memory for the data object.

13. The DS processing unit of claim 12, wherein the at least one processing module is further operable to:
allocate a greater weight to a first favorable comparison between a first DSN attribute and the first storage requirement with the first higher priority level; and
allocate a lesser weight to a second favorable comparison between a second DSN attribute and the second storage requirement with the second lower priority level.

14. The DS processing unit of claim 13, wherein the one or more DSN attributes includes one or more of the following: cost, geographic location, geographic diversity, performance, reliability, latency, capacity, load and availability.

15. The DS processing unit of claim 12, wherein the at least one processing module is further operable to:
generate a billing record in response to storing the data object in the selected DSN memory; and
transmit the billing record to the DS managing unit for aggregation with into one or more billing records associated with a user.

16. The DS processing unit of claim 12, wherein the at least one processing module is further operable to:
receive a local access control list (ACL) from the DS managing unit; and
access the local access control list (ACL) to authenticate a user device identified as a source of the store request message.

17. The DS processing unit of claim 12, wherein the at least one processing module is operable to partition the data object into a plurality of data segments and process a data segment of the plurality of data segments to generate a plurality of encoded data slices using the error encoding dispersal function by:
encoding the plurality of data segments using the error encoding dispersal function to generate a plurality of encoded data segments; and
interleaving the plurality of encoded data segments into the plurality of encoded data slices.

18. The DS processing unit of claim 17, wherein the at least one processing module is operable to encode the plurality of data segments using the error encoding dispersal function to generate the plurality of encoded data segments by:
arranging data blocks of one data segment of the plurality of data segments into a data matrix;
generating an encoded data matrix based on the data matrix and an encoding matrix; and
arranging data blocks of the encoded data matrix into an encoded data segment.

* * * * *